United States Patent
Teng

(10) Patent No.: US 7,532,643 B2
(45) Date of Patent: *May 12, 2009

(54) ALIGNING DATA PACKETS/FRAMES FOR TRANSMISSION OVER A NETWORK CHANNEL

(75) Inventor: Chia-Yuan Teng, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 11/349,662

(22) Filed: Feb. 7, 2006

(65) Prior Publication Data

US 2006/0126663 A1 Jun. 15, 2006

Related U.S. Application Data

(63) Continuation of application No. 09/858,532, filed on May 15, 2001, now Pat. No. 7,031,342.

(51) Int. Cl.
*H04J 3/16* (2006.01)

(52) U.S. Cl. ........................ 370/468; 370/465; 370/469

(58) Field of Classification Search .................. None
See application file for complete search history.

(56) References Cited

U.S. PATENT DOCUMENTS

| 6,567,402 | B1 * | 5/2003 | Jones et al. ................. 370/360 |
| 6,687,247 | B1 * | 2/2004 | Wilford et al. .............. 370/392 |
| 7,031,293 | B1 * | 4/2006 | Srikrishna et al. ........... 370/348 |
| 7,031,342 | B2 * | 4/2006 | Teng .......................... 370/469 |
| 2003/0054755 | A1 * | 3/2003 | Zehavi et al. .................. 455/1 |
| 2005/0058149 | A1 * | 3/2005 | Howe .......................... 370/428 |

* cited by examiner

*Primary Examiner*—Phirin Sam
(74) *Attorney, Agent, or Firm*—Cesari and McKenna, LLP

(57) ABSTRACT

Data transmission over a network is disclosed. The data transmission includes aligning boundaries of application, transport, network, and data link layer packets. The transmission also includes receiving data transmission channel information, and determining a suitable number of data link layer packets per application/transport/network layer packet. The determination is based on the channel information. The suitable number of data link layer packets allows continuous alignment between the boundaries of the application, transport, network, and data link layer packets.

20 Claims, 6 Drawing Sheets

ALIGNING DATA PACKETS/FRAMES FOR TRANSMISSION OVER A NETWORK CHANNEL

This application is a continuation application and claims the priority date of U.S. patent application Ser. No. 09/858,532, filed May 15, 2001, now issued as U.S. Pat. No. 7,031,342.

BACKGROUND

The present invention relates to transmission of information packets, and more particularly, to aligning and determining data packets for transmission of data over a network channel.

Data, e.g. an image, transmitted over a network may travel through several layers based on Transmission Control Protocol/Internet Protocol (TCP/IP) reference model. These layers may include application, transport, network, data link, and physical layers. Each layer may add a header to address data parameters.

FIG. 1 illustrates an exemplary layering and encapsulation structure 100. For example, an application layer image 102 may be digitized and compressed. The compressed image may then be segmented and encapsulated into several Real-time Transport Protocol (RTP) packets 104 residing at the transport layer.

In some cases, the data may be segmented into independent decoding units (IDU) prior to compression to reduce error propagation during compression and transmission. Each RTP packet 104 may include a 12-byte header 106. The RTP packet 104 may further be encapsulated into a Transmission Control Protocol (TCP) or User Datagram Protocol (UDP) packet 108. At the next lower layer, e.g. the network layer, each TCP/UDP packet 108 may be encapsulated into an Internet Protocolg (IP) packet or datagram 110. Each IP datagram 110 may then be fragmented into one or more frames 112 at the data link layer, such as Layer 2. However, difficulties associated with this structure 100 include the loss or corruption of a single frame at the data link layer propagating into successively higher layers to invalidate a large number of packets.

SUMMARY

In one aspect, the present disclosure describes a method for transmitting data over a network. The method includes aligning boundaries of application, transport, network, and data link layer packets. The method also includes receiving data transmission channel information, and determining a suitable number of data link layer packets per application/transport/network layer packet. The determination is based on the channel information. The suitable number of data link layer packets allows continuous alignment between the boundaries of the application, transport, network, and data link layer packets.

In another aspect, a method for determining a suitable number of frames per datagram (k) is described. The method includes receiving data transmission channel information. The channel information includes a frame error rate ($P_{e,f}$), a frame size (F), a data-gram header size (H), and a maximum number of retransmissions allowed (L). The method further includes computing the suitable number as $$\sqrt{\frac{H}{FP_{e,f}}},$$

when the frame error rate ($P_{e,f}$) is sufficiently small. When the frame error rate ($P_{e,f}$) is not sufficiently small, but an independent decoding unit (IDU) error rate ($P_{e,d}$) after L retransmissions is sufficiently small, the suitable number is computed by finding a solution to $$H - \sum_{i=2}^{L} P_{e,f}^{i-1}(HP_{e,f} + F)(i-1)k^i - LFP_{e,f}^L k^{L+1} = 0.$$

Otherwise when the IDU error rate ($P_{e,d}$) after L retransmissions is not sufficiently small, the suitable number of frames is computed by finding a solution to $$H - \sum_{i=2}^{L} P_{e,f}^{i-1}(HP_{e,f} + F)(i-1)k^i - (LF + (L+2)HP_{e,f})P_{e,f}^L k^{L+1} - FP_{e,f}^{2L+1}k^{2L+2} + \sum_{i=0}^{L-1}(i-L-1)(HP_{e,f} + F)P_{e,f}^{i+L+1}k^{i+L+2} = 0.$$

DETAILED DESCRIPTION

The present application is a continuation of U.S. application Ser. 09/858,532, filed May 15, 2001, which is held in common ownership by the assignee of the present application.

In recognition of the above-described difficulties in using the prior method of data transmission over a network, the invention describes, in one aspect, a technique for aligning the boundaries of packets. The term "packet" may comprise the data unit defined at the application, transport, network, or data link layer. Thus, the packet may be an independent decoding unit (IDU), an IP/UDP/RTP datagram, or a frame. However to reduce the confusion, the following designations will be used throughout the present disclosure. Packets at the application layer are referred to as IDUs; packets at the transport and network layers are referred to as datagrams; and packets at the data link layer are referred to as frames.

The alignment technique also involves determining a suitable number of data link layer frames per application/transport/network layer IDU/datagram. In one embodiment, this is equivalent to finding a suitable number of frames to pack information from a single IDU/datagram. Consequently for purposes of illustration and not for purposes of limitation, the exemplary embodiments of the invention are described in manner consistent with such use, though the invention is not so limited.

Figure 1:
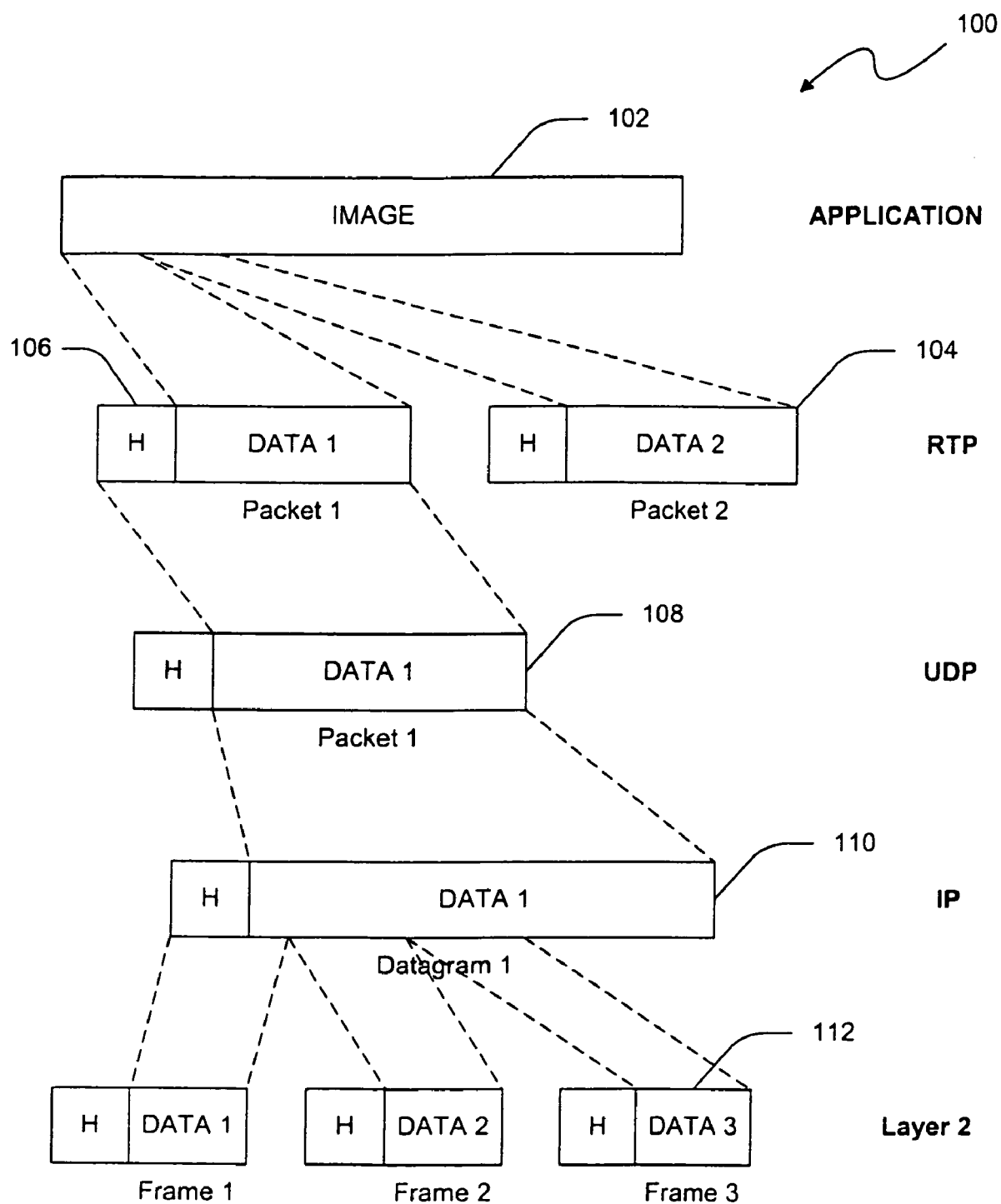
FIG. 1 illustrates a conventional layering and encapsulation structure.
Figure 2:
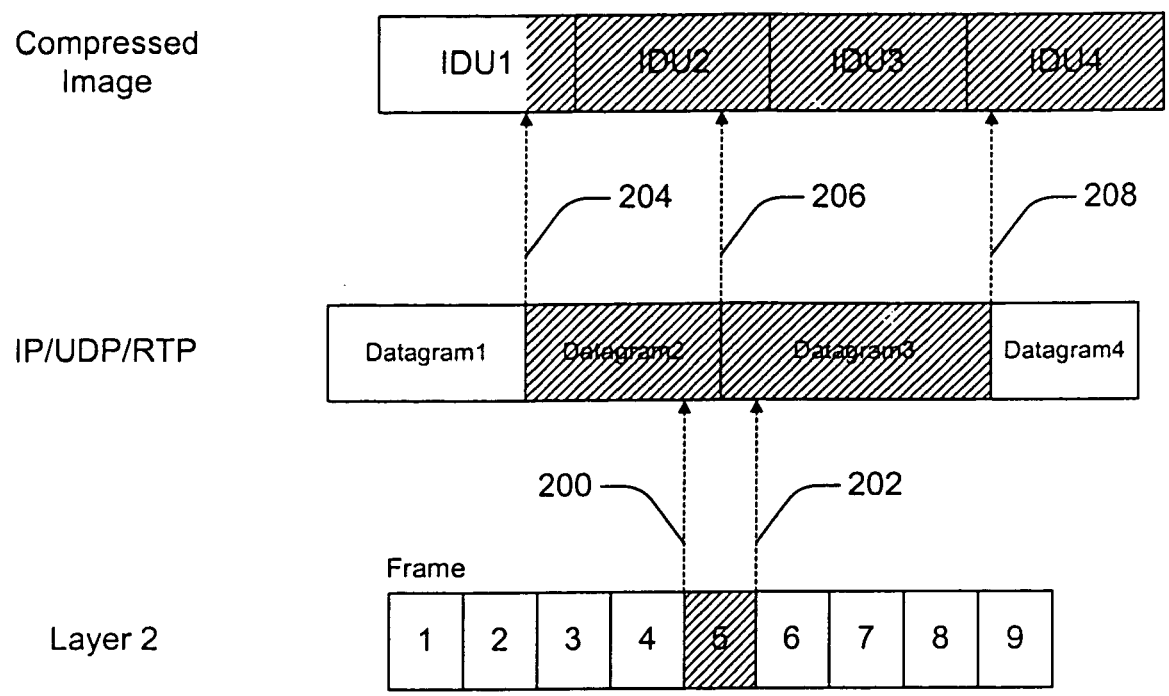
FIG. 2 illustrates a typical layout of a layering and encapsulation structure.

FIG. 2 illustrates a typical layout of the layering and encapsulation structure 100 of FIG. 1. Since data transmission standards often do not specify the size of an independent decoding unit (IDU) or datagram, the boundaries of IDUs, datagrams, and frames, at different layers, may not align with each other as shown in 200-208.

For example, loss or corruption of frame 5 at Layer 2, during data transmission over a network, may result in the corruption of two datagrams 2 and 3. The corruption of the two datagrams may occur because the boundaries of frame 5 overlap, as shown in 200, 202, the extent of both datagrams 2 and 3. Thus, the corruption may occur even though the size of the frames may be significantly smaller than that of the datagrams. The corruption of the datagrams may result in dropping of the corrupted datagrams.

The corrupted datagrams may then result in the corruption of independent decoding units (IDU) in the compressed data at the application layer. For example, the boundaries of corrupted datagram 2 overlap, as shown in 204, 206, the extent of IDUs 1 and 2. Only a part of IDU 1 may become corrupted. However, the corrupted part may prevent the entire IDU from being correctly decoded because the compressed data within an IDU are correlated. Moreover, the boundaries of corrupted datagram 3 overlap, as shown in 206, 208, the extent of IDUs 3 and 4. Thus, the corruption of a single frame (e.g. frame 5) may propagate through the layers to cause the corruption of 4 IDUs.

Figure 3:
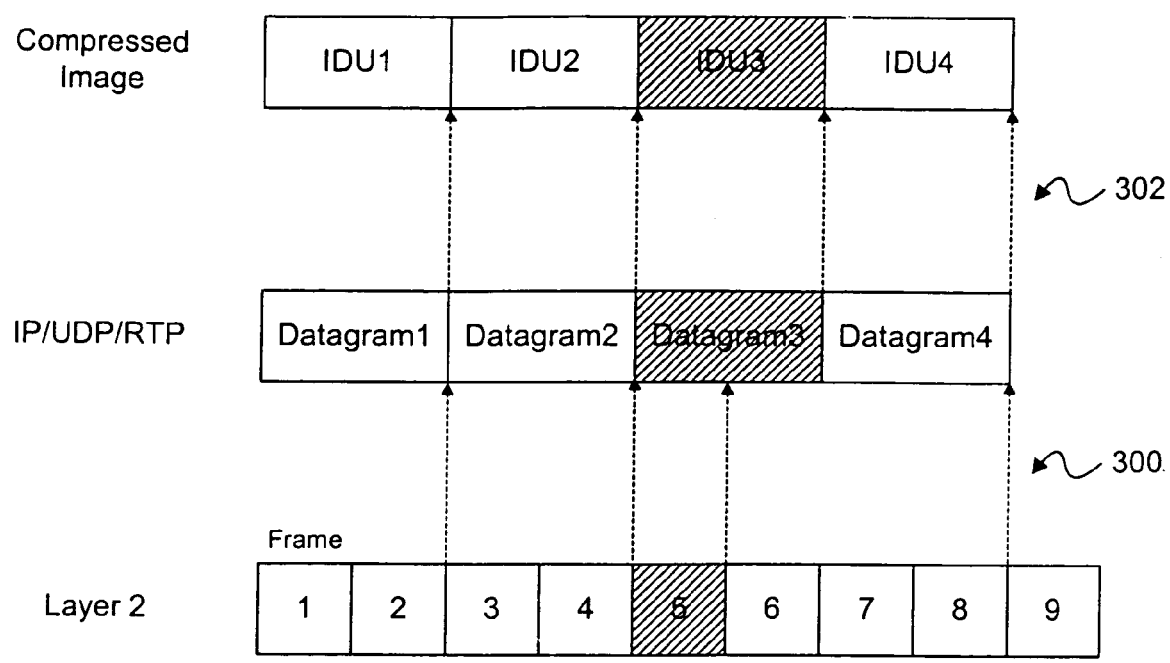
FIG. 3 illustrates a layout of a layering and encapsulation structure according to one embodiment of the present invention.

FIG. 3 illustrates the layout of the layering and encapsulation structure according to one embodiment of the present invention. The frames, datagrams, and IDUs are properly aligned (see 300, 302) to substantially reduce the propagation of a corrupted frame into two or more IDUs. Thus, the boundary of an IP/UDP/RTP datagram is aligned along the boundary of a frame in Layer 2.

In the illustrated embodiment, the size of an IDU matches that of a datagram. However, the IDU size, with respect to the datagram size, may be adjusted according to the structure of the compression scheme. Furthermore, in the illustrated embodiment of FIG. 3, each datagram is divided into two frames (k=2). A variable k may be used to denote the number of frames comprising an IDU/datagram. The datagram size, with respect to the frame size, may be adjusted to vary the value of k.

Further, because some IDU parameters are same as those in IP/UDP/RTP headers, those parameters may be discarded to prevent redundancy. For example, the 6-byte start-of-partition (SOP) marker defined in JPEG-2000 may be discarded.

Since data transmission standards often fix the frame size in the data link layer (e.g. Layer 2), the value of k may be adjusted by controlling the size of the IP/UDP/RTP datagram. The value of k may be selected in a trade-off as follows. To reduce the impact of a corrupted frame, the value of k should be chosen as small as possible. Thus, small k means reducing the datagram size with respect to the frame size. However, a small k has the disadvantage of bearing the load of a large IP/UDP/RTP header overhead. For example, a typical IP/UDP/RTP datagram has a 40-byte header, which may be shared by k frames. If k is chosen to be a small value, the 40-byte header may be distributed among a small number of frames. However, if k is chosen to be a large value, such as 10, the 40-byte header may be distributed among 10 frames. In this case, each frame would carry a header with only about 4 bytes.

As mentioned above, since the IDU size matches the resultant value of k times the frame size, adjusting the IDU/datagram size may be equivalent to finding a suitable value for k. This suitable value of k (e.g. k*) may be defined as the number of frames per IDU that maximizes the actual uncorrupted throughput. The definition of the "actual uncorrupted throughput" may be defined as the rate of uncorrupted data, excluding headers.

Suppose C represents the ideal throughput with no errors and no headers. Using $P_{e,d}$ as the IDU error rate, F as the frame size, H as the IDU header size, L as the maximum number of retransmissions allowed, and k as the number of frames encapsulated in one IDU, the actual uncorrupted throughput may be expressed as:

$$T = (1 - P_{e,d}^{L+1}) \frac{kF}{(kF+H)\sum_{i=0}^{L} P_{e,d}^i} C. \tag{1}$$

If $P_{e,f}$ represents the frame error rate, then the relationship between $P_{e,d}$ and $P_{e,f}$ may be expressed as:

$$P_{e,d} = 1 - (1 - P_{e,f})^k. \tag{2}$$

Further, if the value of $P_{e,f}$ is small (e.g. $P_{e,f} < 0.2\%$), equation (2) may be simplified as $$P_{e,d} = kP_{e,f}. \tag{3}$$

Thus, equation (1) becomes $$T = (1 - (kP_{e,f})^{L+1}) \frac{kF}{(kF+H)\sum_{i=0}^{L} (k^i P_{e,f}^i)} C. \tag{4}$$

If the value of $k*P_{e,f}$ is small, equation (4) may be further simplified as:

$$T = \frac{kF}{(kF+H)(kP_{e,f}+1)} C. \tag{5}$$

Therefore, the value of k* to maximize the actual uncorrupted throughput T may be expressed as:

$$k^* = \sqrt{\frac{H}{FP_{e,f}}}. \tag{6}$$

Otherwise if the value of $k*P_{e,f}$ is not sufficiently small, equation (4) should be modified. If the IDU error rate ($P_{e,d}$) after L number of retransmissions is small (e.g. $P_{e,d} < 5\%$), then equation (1) may be simplified as:

$$T = \frac{kF}{(kF+H)\sum_{i=0}^{L}(k^i P_{e,f}^i)} C. \quad (7)$$

Therefore, the value of k* may be obtained by finding a solution to the polynomial equation derived from equation (7):

$$H - \sum_{i=2}^{L} P_{e,f}^{i-1}(HP_{e,f} + F)(i-1)k^i - LFP_{e,f}^L k^{L+1} = 0. \quad (8)$$

Otherwise if the IDU error rate after L number of retransmissions is not sufficiently low, the value of k* may be obtained by finding a solution to polynomial equation derived from equation (1):

$$H - \sum_{i=2}^{L} P_{e,f}^{i-1}(HP_{e,f}+F)(i-1)k^i - (LF+(L+2)HP_{e,f})P_{e,f}^L k^{L+1} - \\ FP_{e,f}^{2L+1}k^{2L+2} + \sum_{i=0}^{L-1}(i-L-1)(HP_{e,f}+F)P_{e,f}^{i+L+1}k^{i+L+2} = 0. \quad (9)$$

Figure 4:
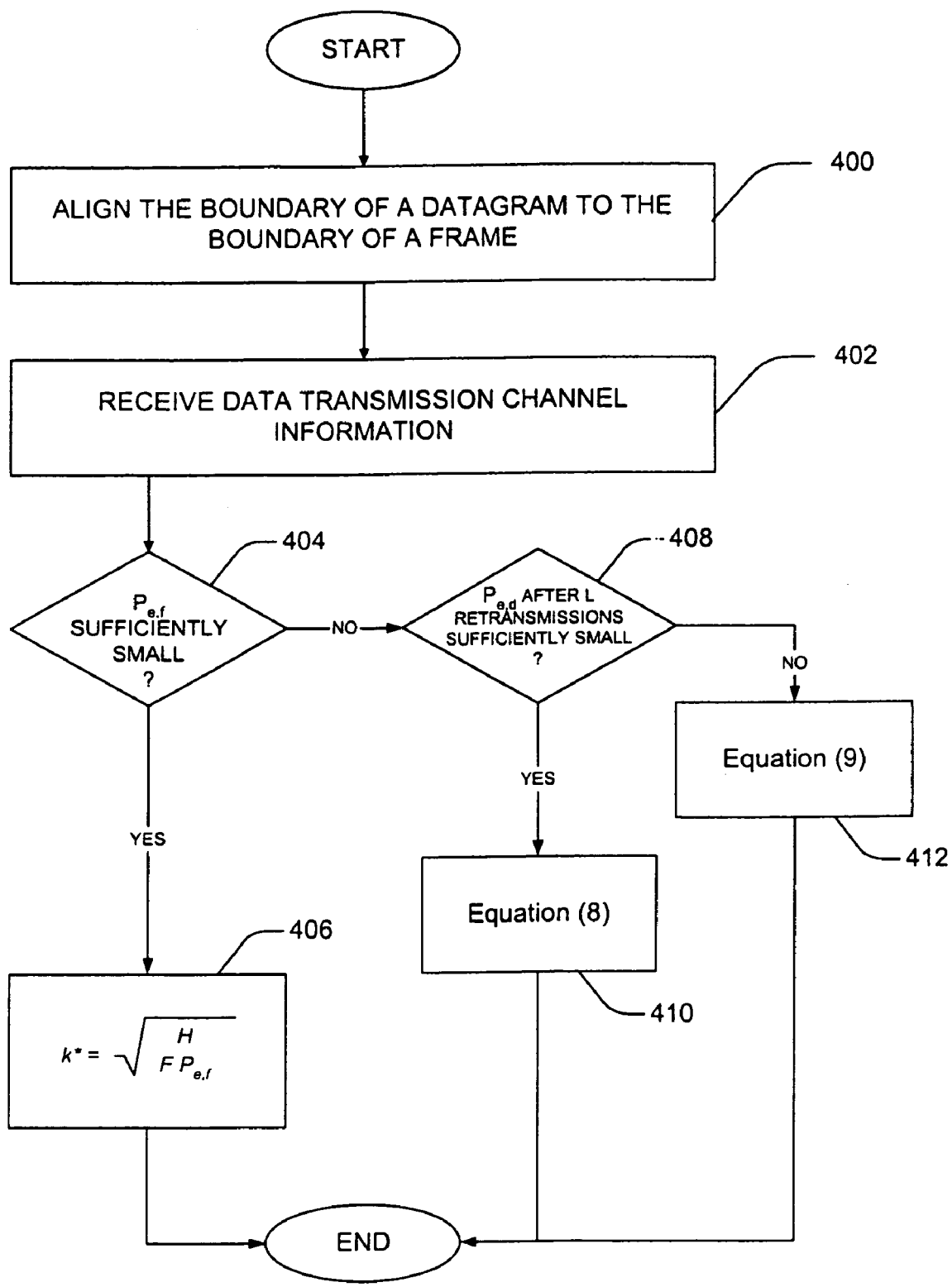
FIG. 4 shows a technique for determining a suitable number of frames (k*) to pack information from a single IDU/datagram.

Accordingly, a technique for determining a suitable number of frames (k*) to pack information from a single IDU/datagram is illustrated in FIG. 4, in accordance with an embodiment of the present invention. The technique involves aligning the boundary of an IDU/datagram to the boundary of a frame, at 400. The technique also includes receiving data transmission channel information at 402. The received channel information includes frame error rate ($P_{e,f}$), frame size (F), IDU/datagram header size (H), and maximum number of retransmissions allowed (L).

In a given data transmission system, the frame size (e.g. in bytes) and the maximum number of retransmissions are often fixed. Therefore, finding a suitable IDU/datagram size may be equivalent to finding a suitable value for k.

If the value of $P_{e,f}$ is determined to be small at 404, the suitable value of k is computed as $$k^* = \sqrt{\frac{H}{FP_{e,f}}},$$

at 406.

Otherwise if the IDU error rate ($P_{e,d}$) after L number of retransmissions is determined to be small at 408, the suitable value of k is obtained by finding a solution to the polynomial equation $$H - \sum_{i=2}^{L} P_{e,f}^{i-1}(HP_{e,f}+F)(i-1)k^i - LFP_{e,f}^L k^{L+1} = 0,$$

at 410. Otherwise if the IDU error rate ($P_{e,d}$) after L number of retransmissions is determined to be sufficiently large at 408, the suitable value of k is obtained by finding a solution to the polynomial equation $$H - \sum_{i=2}^{L} P_{e,f}^{i-1}(HP_{e,f}+F)(i-1)k^i - (LF+(L+2)HP_{e,f})P_{e,f}^L k^{L+1} - \\ FP_{e,f}^{2L+1}k^{2L+2} + \sum_{i=0}^{L-1}(i-L-1)(HP_{e,f}+F)P_{e,f}^{i+L+1}k^{i+L+2} = 0,$$

at 412.

Figure 5:
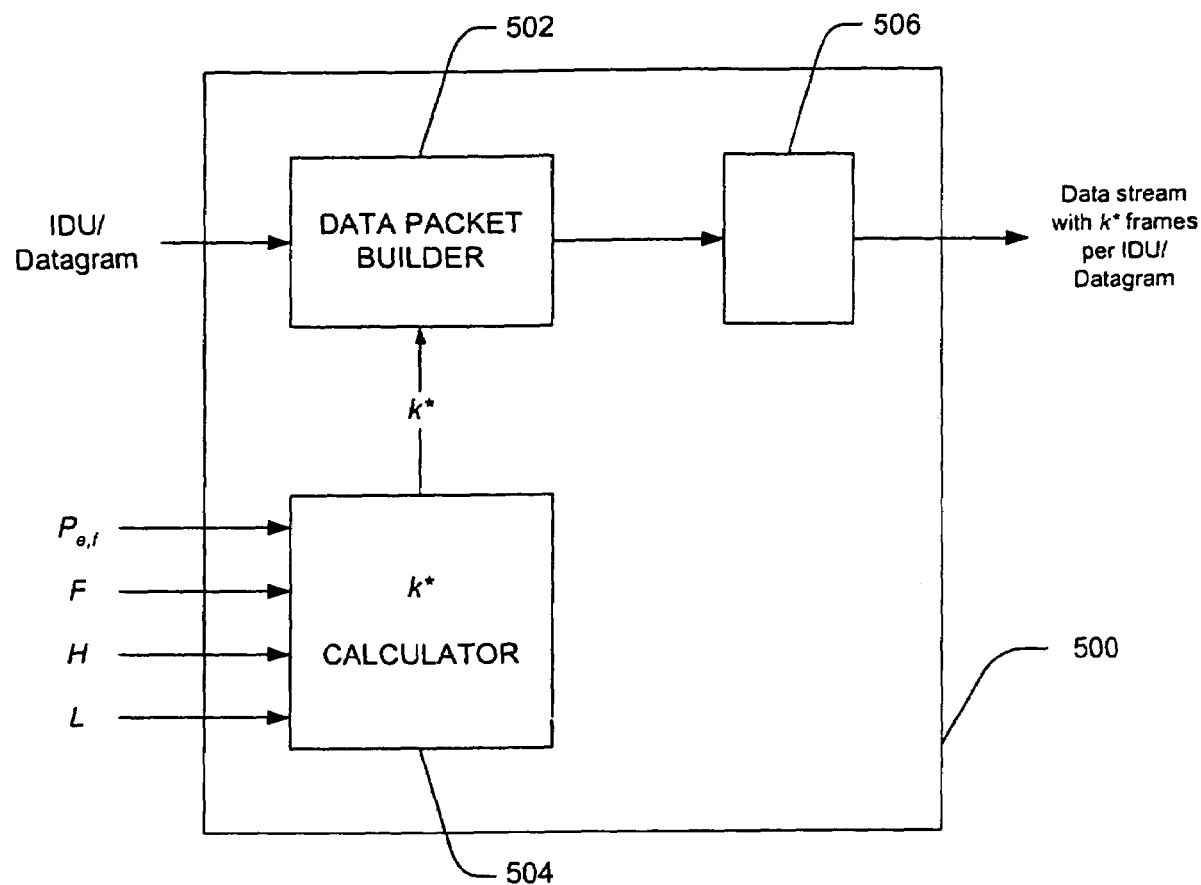
FIG. 5 is a block diagram of a packet transmission system according to an embodiment of the present invention.

FIG. 5 is a block diagram of a packet transmission system 500 according to an embodiment of the present invention. The transmission system 500 receives input data and packetizes the data for transmission. The system 500 appropriately prepares and builds the frames so that the frame boundaries are aligned with the boundaries of IDU/datagrams. The system 500 includes a data packet builder 502, a calculator 504, and a channel interface module 506.

The calculator 504 receives input parameters, such as frame error rate ($P_{e,f}$), frame size (F), IDU/datagram header size (H), and maximum number of retransmissions allowed (L). Using these parameters, the calculator 504 computes a suitable number of frames per IDU/datagram (k*). This number (k*) is then sent to the data packet builder 502. The data packet builder 502 aligns and segments the input data packet into the suitable number of frames (k*) per input data packet (e.g. datagram). The frames are then output to the channel interface module 506 for delivery across a network through the data transmission channel.

Figure 6:
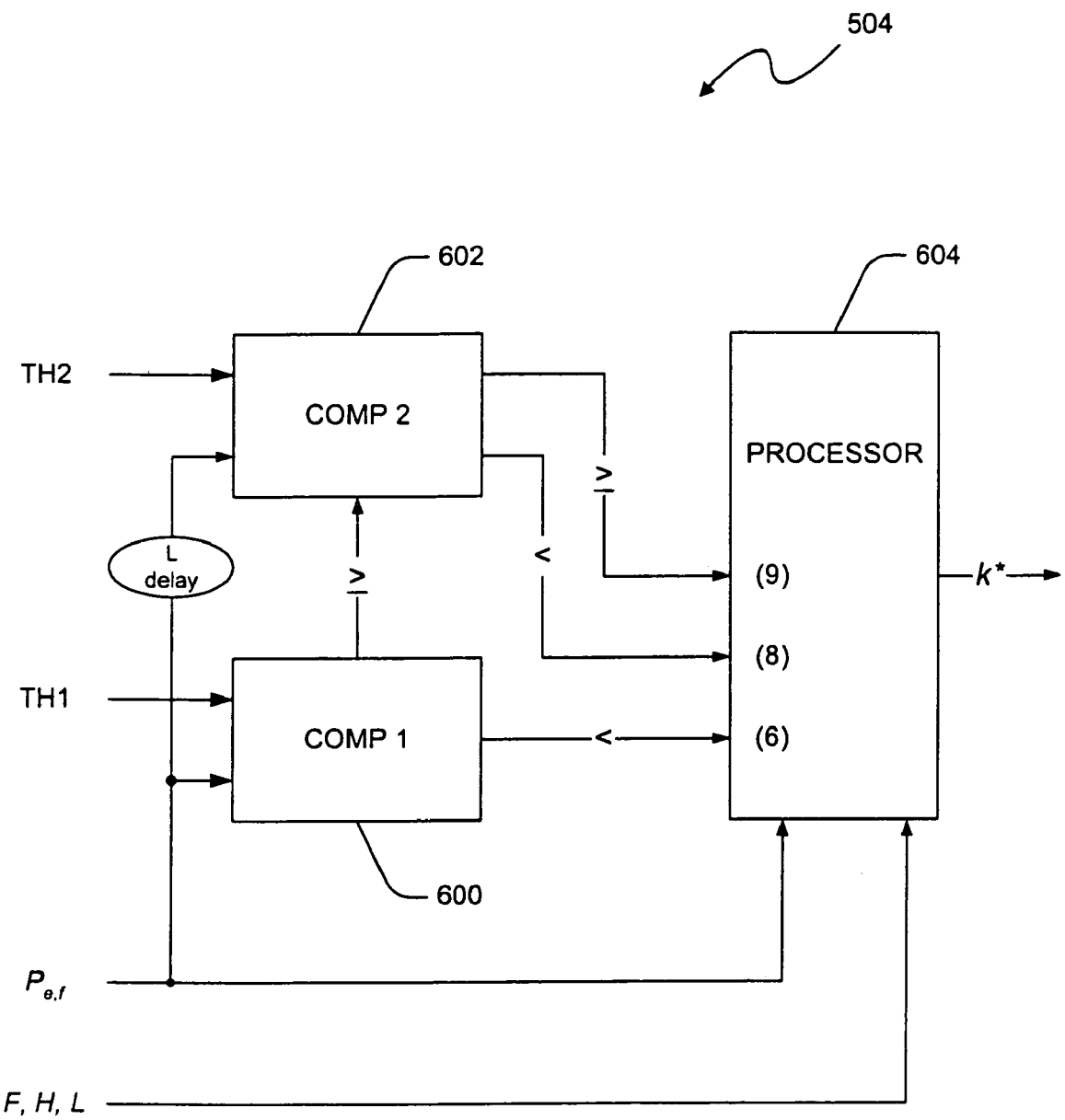
FIG. 6 is a block diagram of a calculator according to an embodiment.

A block diagram of the calculator 504 is shown in FIG. 6. The calculator 504 includes at least one comparator 600, 602, and a processor 604. The first comparator 600 operates to compare the frame error rate ($P_{e,f}$) with a first threshold value to determine whether the error rate ($P_{e,f}$) is sufficiently small. If the error rate is sufficiently small, the first comparator 600 sends a signal to the processor 604 to select k* according to the equation $$k^* = \sqrt{\frac{H}{FP_{e,f}}}.$$

The processor 604 receives input parameters necessary to compute k*. If the error rate is greater than the first threshold, the first comparator 600 sends a signal to the second comparator 602 to compare the IDU error rate after L number of retransmissions with a second threshold value. This value is a threshold set to determine whether the IDU error rate after L retransmissions is sufficiently small.

If the error rate after the L retransmissions is sufficiently small, the second comparator 602 sends a signal to the processor 604 to select k by finding a solution to the polynomial equation $$H - \sum_{i=2}^{L} P_{e,f}^{i-1}(HP_{e,f}+F)(i-1)k^i - LFP_{e,f}^L k^{L+1} = 0.$$

Otherwise if the error rate after the L retransmissions is greater than the second threshold, the value of k* is computed by finding a solution to the below polynomial equation $$H - \sum_{i=2}^{L} P_{e,f}^{i-1}(HP_{e,f} + F)(i-1)k^i - (LF + (L+2)HP_{e,f})P_{e,f}^L k^{L+1} -$$

$$FP_{e,f}^{2L+1} k^{2L+2} + \sum_{i=0}^{L-1}(i-L-1)(HP_{e,f} + F)P_{e,f}^{i+L+1} k^{i+L+2} = 0.$$

A packet alignment technique/system for data transmission has been described. In the illustrated embodiments, the technique/system is arranged to encapsulate one IDU into one IP/UDP/RTP datagram. Each datagram may be segmented and encapsulated into k frames at Layer 2, where k is an integer. By selecting appropriate k for a given frame size, the IDU boundary may be aligned with the datagram boundary and the frame boundary. A suitable value for k should maximize the actual uncorrupted throughput.

While specific embodiments of the invention have been illustrated and described, other embodiments and variations are possible. For example, the calculator 504 of FIG. 6 may be implemented with only one comparator. The comparator may compare frame error rates, before and after retransmissions, with two threshold values. The comparisons may select which of the three equations to use in determining the value of k* in the processor 604.

All these are intended to be encompassed by the following claims.

Appendix

EXAMPLE 1

Problem: Assume that the header size (H) after header compression is 16 bits. Moreover, the mobile data channel has the following characteristics.

Ideal throughput (C)=8 kbps.

Frame error rate $(P_{e,f})=10^{-3}$.

Frame size (F)=160 bits.

Solution: According to

->the suitable k value (k*)=10.       Eq. (6)

->the actual uncorrupted throughput (T)=7.84.       (5)

EXAMPLE 2

Problem: Assume that the header size is 320 bits. Moreover, the channel characteristics are the same as Example 1 except that the frame error rate is $10^{-2}$.

Solution: Because $k^* P_{e,f}$ in this example is not sufficiently small, eq. (8) or (9) may be used instead of (6). The k* may vary according to the value of the maximum number of retransmissions allowed (L).

Case 1: No retransmission allowed (L=0)
Equation (9) becomes $H - 2HP_{e,f}k - FP_{e,f}k^2 = 0$
Therefore, k*=12. According to eq. (1), the actual uncorrupted throughput (T) is 6.03 kbps.

Case 2: Max number of retransmissions allowed=1 (L=1)
Equation (8) becomes $H - FP_{e,f}k^2 = 0$.
Therefore, k*=14. According to eq. (1), the actual uncorrupted throughput (T) is 6.76 kbps.

Case 3: Max number of retransmissions allowed=2 (L=2)
Equation (8) becomes $2F_{e,f}^2 k^3 + (HP_{e,f} + F)P_{e,f}k^2 - H = 0$.
Therefore, k*=13. According to eq. (7), the actual uncorrupted throughput (T) is 6.05 kbps.

Case 4: Max number of retransmissions allowed=3 (L=3)
Eq. 8 becomes becomes $3FP_{e,f}^3 k^4 + 2(HP_{e,f} + F)P_{e,f}^2 k^3 + (HP_{e,f} + F)P_{e,f}k^2 - H = 0$.
Therefore, k*=12. According to eq. (7), the actual uncorrupted throughput (T) is 6.04 kbps.

What is claimed is:

1. A system to transmit data over a network, comprising:
a packet builder operable to align boundaries of application, transport, and/or network packets with boundaries of data link layer packets;
a calculator operable to receive data transmission channel information; and
the calculator further operable to determine a number of data link layer packets per application/transport/network layer packet which will maximize uncorrupted throughput based on said channel information, said number of data link layer packets to allow continuous alignment between the boundaries of the application, transport, and/or network packets with boundaries of the data link layer packets.

2. The system of claim 1, wherein the continuous alignment, between boundaries of the application, transport, network, and data link layer packets, is maintained by controlling a size of the application/transport/network layer packet as a multiple of data link layer packet size.

3. The system of claim 1, wherein the application layer packet includes an independent decoding unit (IDU).

4. The system of claim 3, wherein the transport/network layer packet includes a datagram.

5. The system of claim 4, wherein the data link layer packet includes a frame.

6. The system of claim 5, wherein said data transmission channel information includes a frame error rate $(P_{e,f})$, a frame size (F), an IDU/datagram header size (H), and a maximum number of retransmissions allowed (L).

7. The system of claim 6, wherein said calculator determines the number of data link layer packets at least in part by computation of the number of frames per IDU/datagram as $$\sqrt{\frac{H}{FP_{e,f}}},$$

when the frame error rate $(P_{e,f})$ is sufficiently small.

8. The system of claim 7, wherein the frame error rate $(P_{e,f})$ is determined to be sufficiently small when the frame error rate $(P_{e,f})$ is less than 0.2%.

9. The system of claim 6, wherein said data transmission channel information also includes an IDU error rate $(P_{e,d})$.

10. The system of claim 9, wherein said calculator determines the number of data link layer packets at least in part by computation of the suitable number of frames per IDU/datagram by finding a solution to $$H - \sum_{i=2}^{L} P_{e,f}^{i-1}(HP_{e,f} + F)(i-1)k^i - LFP_{e,f}^L k^{L+1} = 0,$$

when the frame error rate $(P_{e,f})$ is not sufficiently small, but the IDU error rate $(P_{e,d})$ after L retransmissions is sufficiently small.

11. The system of claim 10, wherein the frame error rate ($P_{e,f}$) is determined not to be sufficiently small when the frame error rate ($P_{e,f}$) is greater than or equal to 0.2%.

12. The system of claim 10, wherein the IDU error rate ($P_{e,d}$) after L retransmissions is determined to be sufficiently small when the IDU error rate ($P_{e,d}$) is less than 5%.

13. The system of claim 9, wherein said calculator determines the number of data link layer packets at least in part by computation of the number of frames per IDU/datagram by finding a solution to $$H - \sum_{i=2}^{L} P_{e,f}^{i-1}(HP_{e,f} + F)(i-1)k^i - (LF + (L+2)HP_{e,f})P_{e,f}^L k^{L+1} -$$
$$FP_{e,f}^{2L+1}k^{2L+2} + \sum_{i=0}^{L-1}(i-L-1)(HP_{e,f} + F)P_{e,f}^{i+L+1}k^{i+L+2} = 0,$$

when the frame error rate ($P_{e,f}$) is not sufficiently small, and the IDU error rate ($P_{e,d}$) after L retransmissions is also not sufficiently small.

14. The system of claim 13, wherein the IDU error rate ($P_{e,d}$) after L retransmissions is determined not to be sufficiently small when the IDU error rate ($P_{e,d}$) after L retransmissions is greater than or equal to 5%.

15. The system of claim 1 wherein uncorrupted throughput comprises the transmission rate of uncorrupted data, excluding packet header data.

16. A system to determine a suitable number of frames per IDU/datagram, comprising:
a calculator operable to receive data transmission channel information including a frame error rate ($P_{e,f}$), an IDU error rate ($P_{e,d}$), a frame size (F), a datagram header size (H), and a maximum number of retransmissions allowed (L); and
the calculator further operable to compute the suitable number as $$\sqrt{\frac{H}{FP_{e,f}}},$$

when the frame error rate ($P_{e,f}$) is sufficiently small, or find a solution to $$H - \sum_{i=2}^{L} P_{e,f}^{i-1}(HP_{e,f} + F)(i-1)k^i - LFP_{e,f}^L k^{L+1} = 0,$$

when the frame error rate ($P_{e,f}$) is not sufficiently small, but the IDU error rate ($P_{e,d}$) after L retransmissions is sufficiently small, or finding a solution to $$H - \sum_{i=2}^{L} P_{e,f}^{i-1}(HP_{e,f} + F)(i-1)k^i - (LF + (L+2)HP_{e,f})P_{e,f}^L k^{L+1} -$$
$$FP_{e,f}^{2L+1}k^{2L+2} + \sum_{i=0}^{L-1}(i-L-1)(HP_{e,f} + F)P_{e,f}^{i+L+1}k^{i+L+2} = 0,$$

when the frame error rate ($P_{e,f}$) is not sufficiently small, and the IDU error rate ($P_{e,d}$) after L retransmissions is also not sufficiently small.

17. A method, comprising:
aligning a boundary of an application layer, a transport layer, or a network layer packet with a boundary of a data link layer packet;
receiving data transmission channel information;
determining a number of data link layer packets per application layer, transport layer, or network layer packet based on said channel information, the number of data link layer packets to allow continuous alignment between boundaries of application layer, transport layer, or network layer packets with boundaries of data link layer packets; and
building application layer, transport layer, or network layer packets that include the determined number of data link layer packets.

18. The method claim 17, wherein the continuous alignment, between boundaries of application layer, transport layer or network layer packets, and boundaries of data link layer packets is maintained by controlling a size of the application layer, transport layer or network layer packets as a multiple of data link layer packet size.

19. The method claim 17, wherein the data transmission channel information includes one or more of a data link layer error rate; a data link layer size; an application layer, transport layer or network layer header size; and a maximum number of retransmissions allowed.

20. The method claim 17, wherein the number of data link layer packets per application layer, transport layer, or network layer packet are determined as a number that maximizes uncorrupted throughput on a channel.

* * * * *